(12) United States Patent
Mitchell et al.

(10) Patent No.: US 8,027,041 B1
(45) Date of Patent: Sep. 27, 2011

(54) COMPACT SNAPSHOT MULTISPECTRAL IMAGING SYSTEM

(75) Inventors: Thomas A. Mitchell, Nazareth, PA (US); Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 878 days.

(21) Appl. No.: 11/760,133

(22) Filed: Jun. 8, 2007

Related U.S. Application Data

(60) Provisional application No. 60/811,889, filed on Jun. 8, 2006.

(51) Int. Cl.
*G01B 9/02* (2006.01)
*G01J 3/45* (2006.01)

(52) U.S. Cl. ........................................ 356/456

(58) Field of Classification Search ............... 356/451, 356/454, 456; 250/339.07–339.09
See application file for complete search history.

(56) References Cited

U.S. PATENT DOCUMENTS

| | | | | |
|---|---|---|---|---|
| 5,157,258 A * | 10/1992 | Gunning et al. | | 250/339.02 |
| 5,159,199 A * | 10/1992 | LaBaw | | 250/339.02 |
| 5,258,618 A * | 11/1993 | Noble | | 250/332 |
| 6,249,348 B1 * | 6/2001 | Jung et al. | | 356/419 |
| 6,522,403 B2 | 2/2003 | Wilson et al. | | |
| 6,987,274 B1 * | 1/2006 | Street et al. | | 250/458.1 |
| 7,092,101 B2 * | 8/2006 | Brady et al. | | 356/456 |
| 2002/0101587 A1 | 8/2002 | Wilson et al. | | |
| 2002/0190254 A1 * | 12/2002 | Turner et al. | | 257/59 |
| 2003/0193589 A1 * | 10/2003 | Lareau et al. | | 348/294 |
| 2004/0207855 A1 * | 10/2004 | Brady et al. | | 356/451 |
| 2010/0013979 A1 | 1/2010 | Golub et al. | | |

OTHER PUBLICATIONS

Sellar, R. G. et al., Classification of imaging spectrometers for remote sensing applications, Optical Engineering 44 (1), 013602 (Jan. 2005).

* cited by examiner

*Primary Examiner* — Patrick J Connolly
(74) *Attorney, Agent, or Firm* — Burns & Levinson LLP; Orlando Lopez

(57) ABSTRACT

Systems and methods for multispectral imaging.

44 Claims, 13 Drawing Sheets

COMPACT SNAPSHOT MULTISPECTRAL IMAGING SYSTEM

CROSS REFERENCE TO RELATED APPLICATIONS

This application claims priority of U.S. Provisional Application 60/811,889, SNAPSHOT HYPERSPECTRAL IMAGER, filed on Jun. 8, 2006, which is incorporated by reference herein.

BACKGROUND

These teachings relate to compact snapshot multispectral imaging systems.

A multispectral or hyperspectral imaging system (the terms multispectral and hyperspectral are used interchangeably here) is commonly used to observe objects or scenes, whereby light emitted or reflected by a given object or scene is imaged by some means onto a detecting element or array of detecting elements, where multiple images with different spectral content can readily be observed or recorded.

Due to the short temporal duration of many events, it is necessary to capture multispectral data in a short amount of time. A snapshot multispectral imaging system is a multispectral imaging system that captures all desired spectral images at a single moment, rather than relying on either spatial or spectral scanning of the object or scene.

In many designs incorporating snapshot multispectral imaging systems, there is a need for the overall system to be compact. Such needs stem from weight and space constraints in the application in which the system is used. Conventional snapshot multispectral imaging systems are typically large in size due to their large single aperture optics or optical relay subsystems.

Recent advances in snapshot multispectral or hyperspectral imaging systems have been made using Computed Tomography Imaging Spectrometer (CTIS) devices. In these devices, the image is dispersed across multiple dispersive orders using a computer generated hologram and onto a single detector or detector array, analogous to integrated slices through the 3D data cube at various angles across the two spatial dimensions. Using reconstructive techniques similar to those used in CT scans in the medical field, they used computed tomography to build up the 3D data cube from the two dimensional detector. In this manner, spatial and spectral information is captured in a single integration time. Unfortunately, this technique has limitations on the spatial and spectral resolutions that can be captured due to the limited number of dispersive orders that can be generated. Furthermore, these systems tend to be fairly large.

There is therefore a need for a snapshot multispectral imaging system that is more compact in physical size than current multispectral imaging systems.

Furthermore, there is also a need for a snapshot multispectral imaging system that has greater spatial and spectral resolution than current imaging systems.

Furthermore, there is also a need for a snapshot multispectral imaging system that has a greater degree of image co-registration than current imaging systems.

Still further, there is a need for an imaging system that provides a combination of the characteristics described above with superior trade-offs than have been previously attainable.

BRIEF SUMMARY

The needs for the teachings set forth above as well as further and other needs and advantages of the present teachings are achieved by the embodiments of the teachings described hereinbelow.

In one embodiment, an optical system of these teachings includes an array of filters with varying spectral transmission characteristics capable of receiving electromagnetic radiation from a source and transmitting at least a portion of the electromagnetic radiation received from the source, an array of micro-optic imaging subsystems capable of receiving electromagnetic radiation from the array of filters and imaging at least a portion of the received electromagnetic radiation onto an image plane.

In another embodiment, the optical system of these teachings includes a filter capable of substantially operating as a filter array.

Various other embodiments of the optical system of these teachings and embodiments of the method of these teachings of are also disclosed.

In one embodiment of the present teachings the array of micro-optic imaging subsystems are miniaturized and tiled into an array, which is placed behind a filter with an array of spectral transmission characteristics and in front of an image plane, detector, or detector array. These arrays can comprise, but are not limited to, micro-optic elements that are arranged in proximity to one another. In this manner, an array of spectrally varying images can be generated at the image plane.

For a better understanding of the present teachings, together with other and further needs thereof, reference is made to the accompanying drawings and detailed description and its scope will be pointed out in the appended claims.

BRIEF DESCRIPTION OF THE DRAWINGS

FIG. 3 is an isometric quarter cutaway view of the embodiment of the present teachings illustrated in FIG. 2a;

FIG. 5 is a front facing view of the filter array component of the embodiment of the present teachings illustrated in FIG. 2a;

DETAILED DESCRIPTION

Compact snapshot multispectral optical systems are disclosed hereinbelow.

The terms "micro-optics" and "micro-optical component" as used herein, refer to optical components having apertures substantially smaller than the entrance pupil of the conventional optical imaging subsystems discussed herein. The micro-optical components can be refractive, diffractive or reflective or any combination thereof. Exemplary micro-optical components include, but are not limited to, diffractive, refractive, and hybrid micro-lenses, GRIN rod lenses, micromirrors and micro-prisms.

The term "gradient index rod lens" as used herein, refers to radial gradient index optical components.

Figure 1:
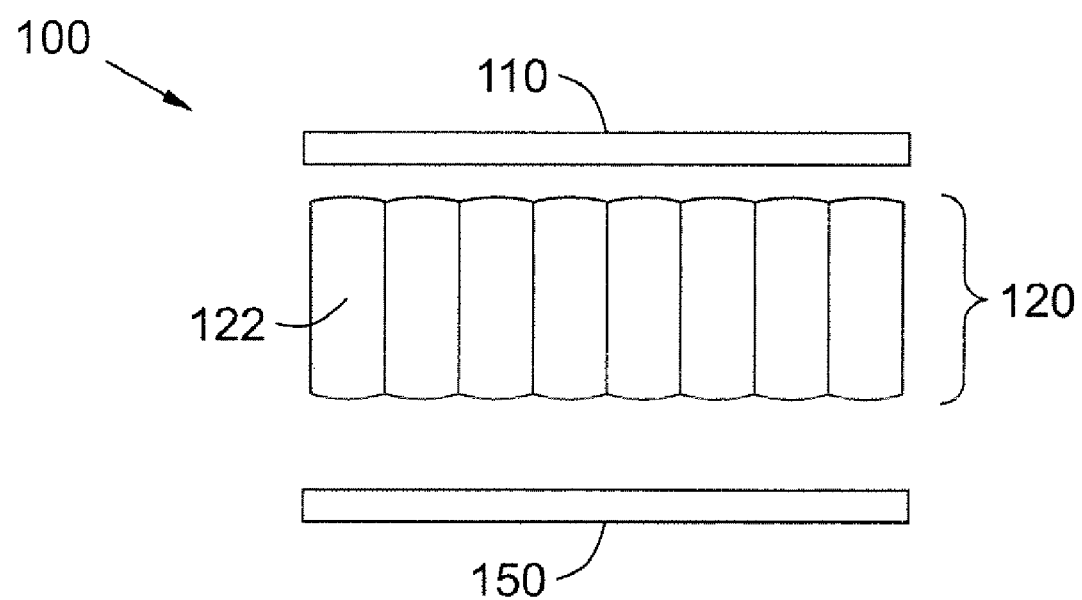
FIG. 1 is a schematic sectional view of a compact snapshot multispectral imaging system in accordance with an embodiment of the present teachings taken along a plane containing a column of optical axes.

Reference is made to FIG. 1, which is a schematic sectional view of an embodiment of these teachings 100, taken along a plane containing a column of optical axes. Electromagnetic radiation, typically in, but not restricted to, the ultraviolet, visible, and/or infrared bands, hereinafter referred to generally as light, emitted or reflected by a given object, either real or virtual, hereinafter also referred to as a source, is incident upon a filter capable of substantially operating as aspectral filter array 110 (hereinafter referred to as spectral filter array 110) which substantially transmits various portions of the light to an array of lenses 120, in this embodiment consisting of the refractive microlens elements 122, and imaged onto an image plane 150. In this manner, an array of images with varying spectral characteristics is generated at the image plane 150 that are highly co-registered with one another due to the monolithic design of the imaging optics.

The individual filters of the spectral filter array 110 can be, but are not limited to, colored glass or gelatin filters, a substantially bandpass filter, a substantially low-pass filter (also referred to as a long pass filter), a substantially high-pass filter, (also referred to as a short pass filter), or an interference filter.

In some applications, although not a limitation of these teachings, a CCD array, CMOS imager, phosphorescent screen, photographic film, microbolometer array, or other means of detecting light energy, hereinafter referred to generally as a detector or detector array, is substantially located at the image plane. The detector arrays typically consist of many individually readable light detecting pixels or elements. In one embodiment, a detector or detector system, capable of substantially operating as a detector array of the detector elements, is substantially located at the image plane.

In another embodiment, the detector system comprises an array of detector subsystems, each of a detector subsystem being, for example, but not limited to, one of the detectors described above. In one instance, detector system comprises a number of detector subsystems wherein a spectral sensitivity of at least some of detector subsystems is different from a spectral sensitivity of at least some of the other detector subsystems. In this detector system, the multiple detector arrays or subsystems can be different, for example, to cover different spectral bands. In another type of detector system, the detector arrays or subsystems can be similar or identical and used to increase the number of pixels in the imager.

In one embodiment, the detector system is a pixelated detector such as, but not limited to, a CCD array or a CMOS array. In that embodiment, in one instance, each detector element from the detector array includes a number of pixels.

It should be noted that, although in the embodiments of the present invention described here, specific numbers of miniaturized (micro-optic) lens systems are shown, this is not a limitation of these teachings and any pre-determined number of miniaturized (micro-optic) lens systems can be utilized in any one-dimensional or two-dimensional pattern.

Figure 2A:
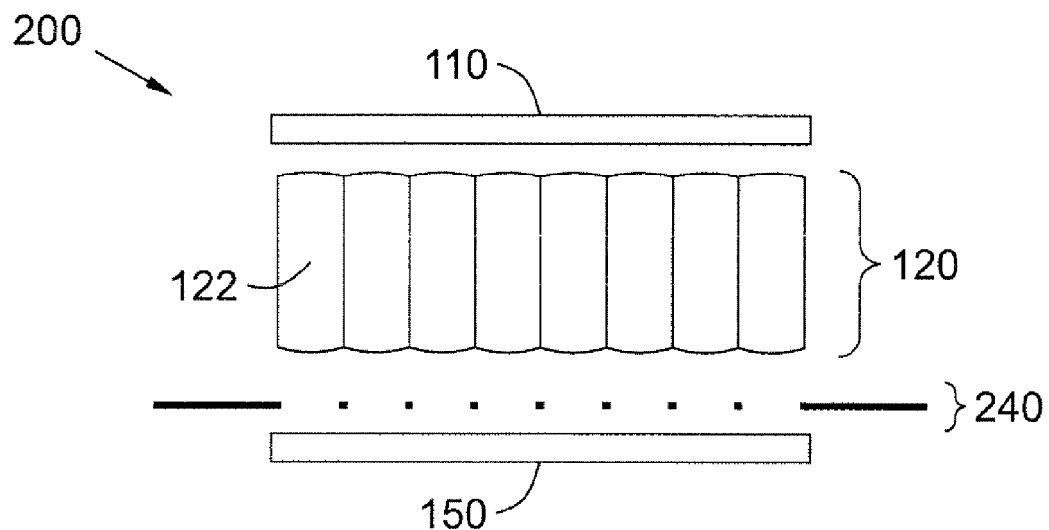
FIG. 2a is a schematic sectional view of a compact snapshot multispectral imaging system in accordance with a further embodiment of the present teachings taken along a plane containing a column of optical axes.

Reference is made to FIG. 2a, which is a schematic sectional view of a further embodiment of these teachings 200, taken along a plane containing a column of optical axes. In operation, light is incident upon a spectral filter array 110 which substantially transmits various portions of the light to an array of lenses 120, in this embodiment consisting of the refractive microlens elements 122. The light is then imaged by the array of lenses 120 onto the image plane 150, passing through an array of apertures, or field stops, 240.

Figure 2B:
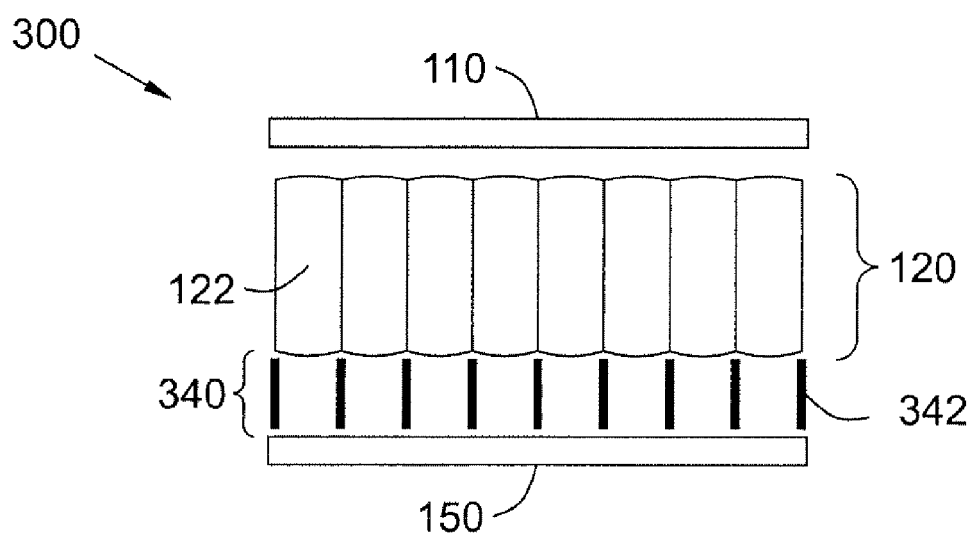
FIG. 2b is a schematic sectional view of a compact snapshot multispectral imaging system in accordance with a further embodiment of the present teachings taken along a plane containing a column of optical axes.

Reference is made to FIG. 2b, which is a schematic sectional view of a further embodiment of these teachings 300, taken along a plane containing a column of optical axes. In operation, light is incident upon a spectral filter array 110 which substantially transmits various portions of the light to an array of lenses 120, in this embodiment consisting of the refractive microlens elements 122. The light is then imaged by the array of lenses 120 onto the image plane 150, passing through an array of baffles 340, in this embodiment consisting of the baffle elements 342.

Figure 3:
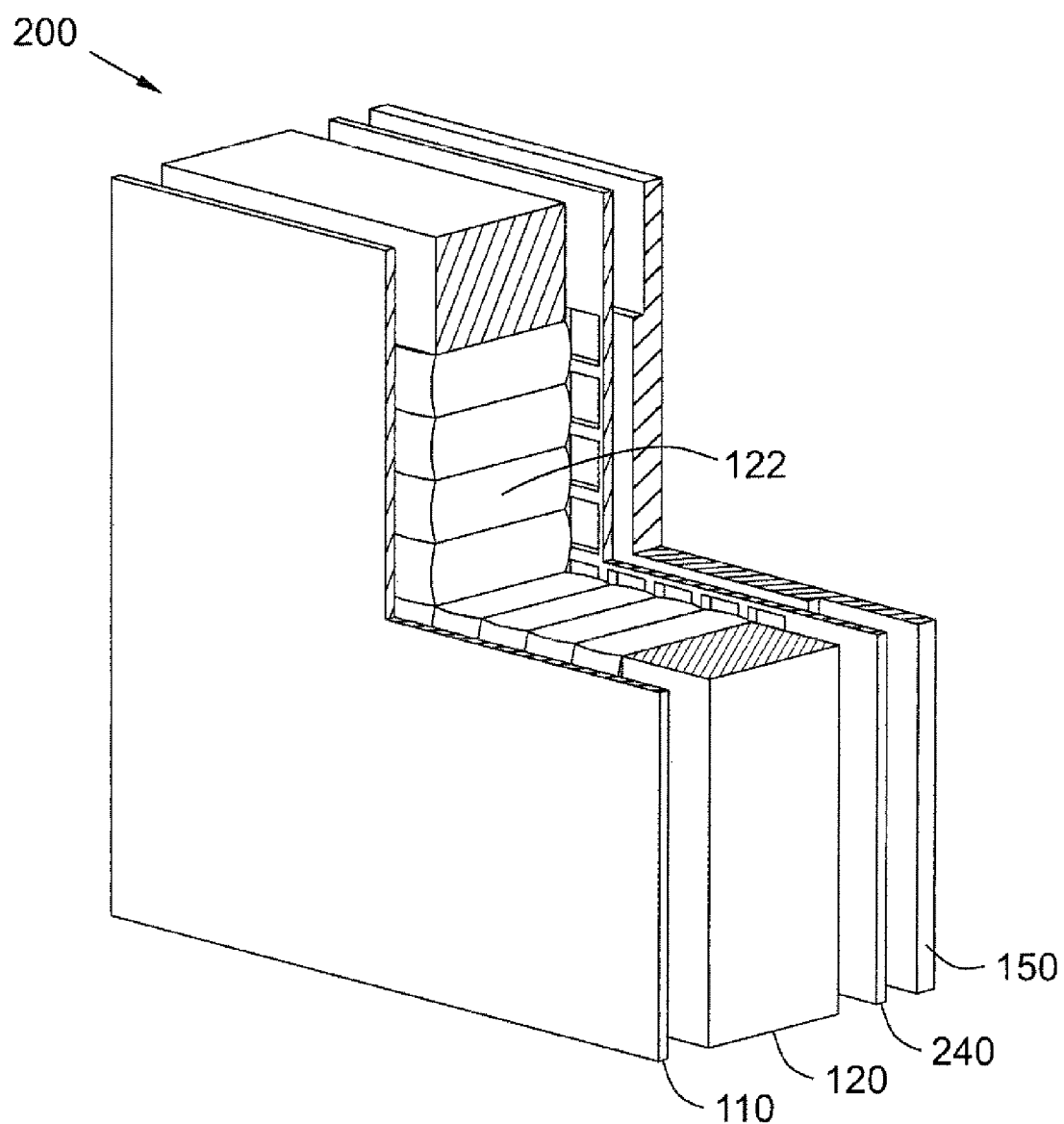

Reference is made to FIG. 3, which is an isometric quarter cutaway view of the embodiment of the present teachings 200 illustrated in FIG. 2a.

Figure 4A:
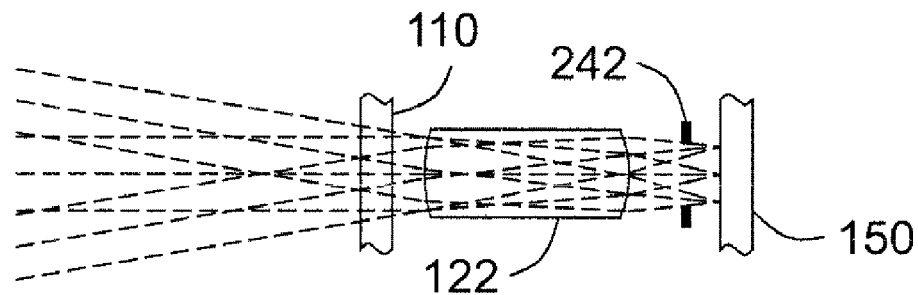
FIG. 4a is a schematic sectional view of a portion of the embodiment of the present teachings illustrated in FIG. 2a taken along the optical axis.

Reference is made to FIG. 4a, which is a schematic sectional view of a portion of the embodiment of the present teachings 200 illustrated in FIG. 2a, taken along the optical axis. At each location in the array of lenses 120, light is incident upon the spectral filter array 110 which substantially transmits a portion of the light to the refractive microlens element 122. The light is then imaged by the microlens element 122 onto the image plane 150, passing through the aperture, or field stop, 242.

Figure 4B:
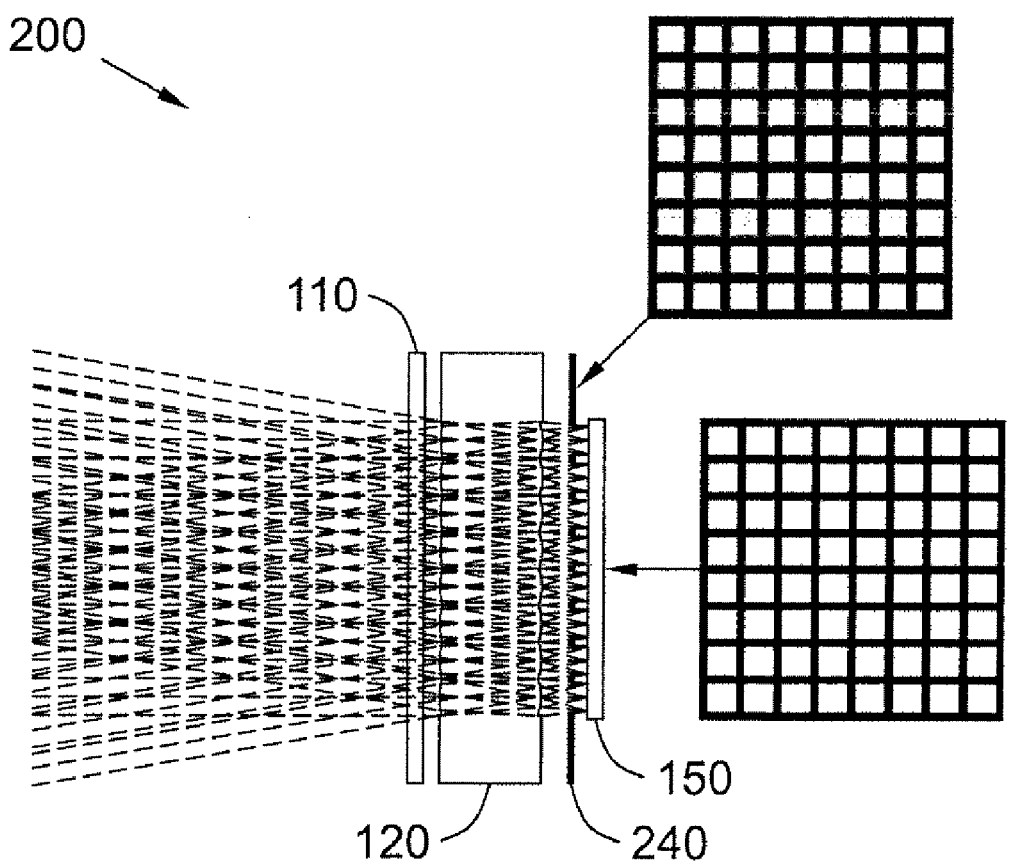
FIG. 4b is schematic sectional view of the present teachings illustrated in FIG. 2a taken along a plane containing a column of optical axes.

Reference is made to FIG. 4b, which is a schematic sectional view of the embodiment of the present teachings 200 illustrated in FIG. 2a.

Figure 5:
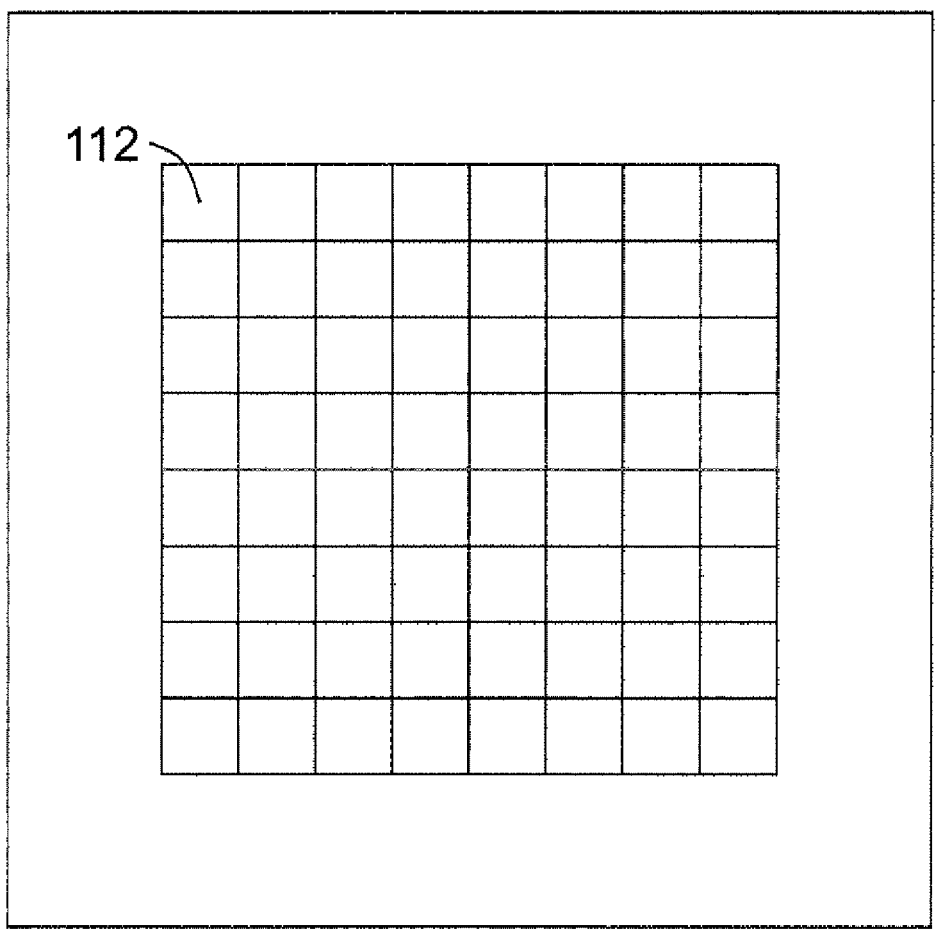

Reference is made to FIG. 5, which is a front facing view of the filter array component 110 of the embodiment of the present teachings 200 illustrated in FIG. 2a. In this embodiment, the spectral filter array consists of a pre-determined arrangement of tiled smaller filter windows 112.

Figure 6:
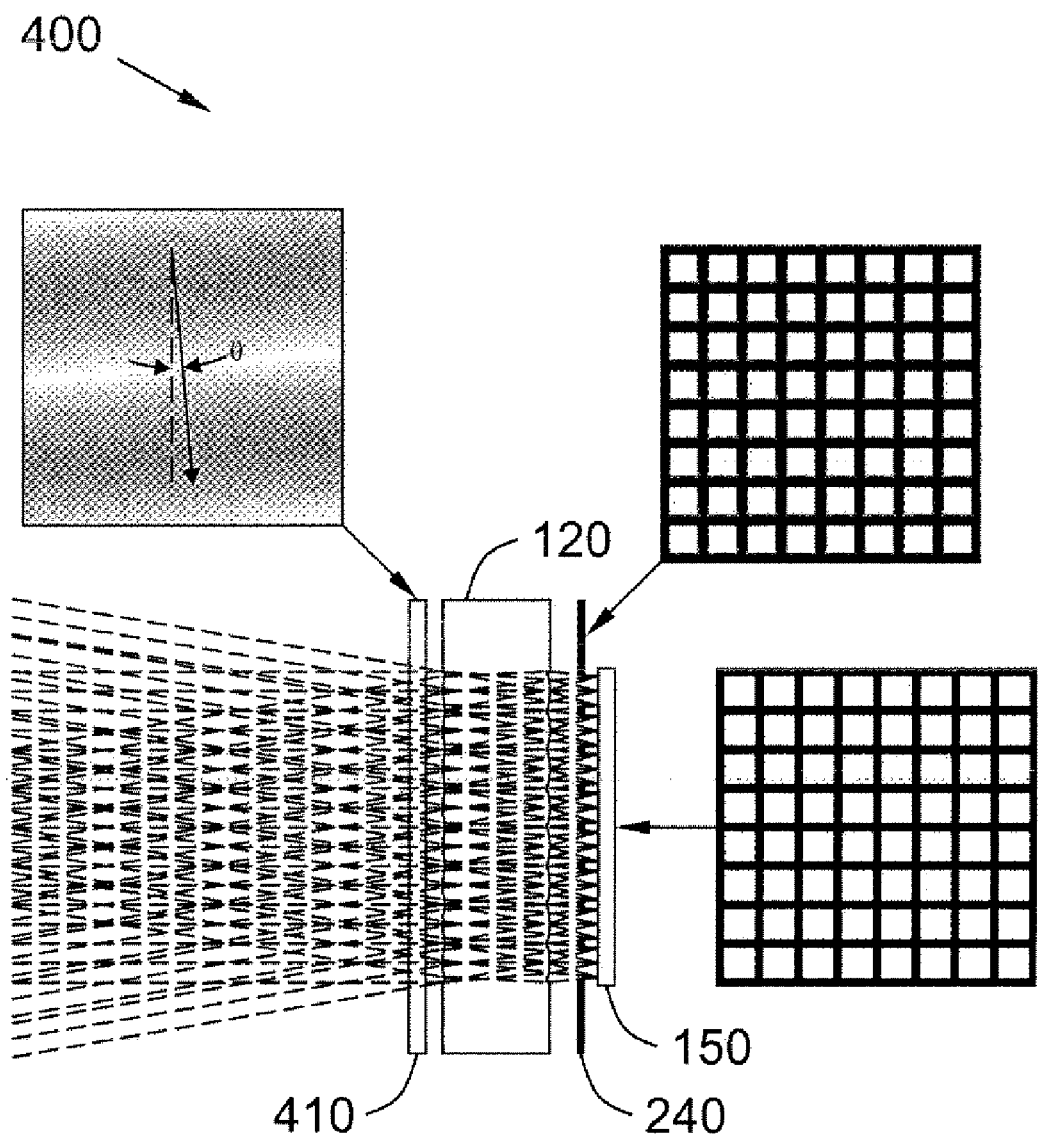
FIG. 6 is a schematic sectional view of a compact snapshot multispectral imaging system in accordance with a further embodiment of the present teachings, taken along a plane containing a column of optical axes.

Reference is made to FIG. 6, which is a schematic sectional view of a further embodiment of these teachings 400, taken along a plane containing a column of optical axes. In operation, light is incident upon a linearly varying spectral filter 410, adapted so that the linearly varying spectral filter substantially operates as a two-dimensional filter array (in one instance, the orientation of the linearly varying filter is in client with respect to an axis of the array of lenses) which substantially transmits various portions of the light to an array of lenses 120, in this embodiment consisting of the refractive microlens elements 122. The light is then imaged by the array of lenses 120 onto the image plane 150, passing through an array of apertures, or field stops, 240.

Figure 7A:
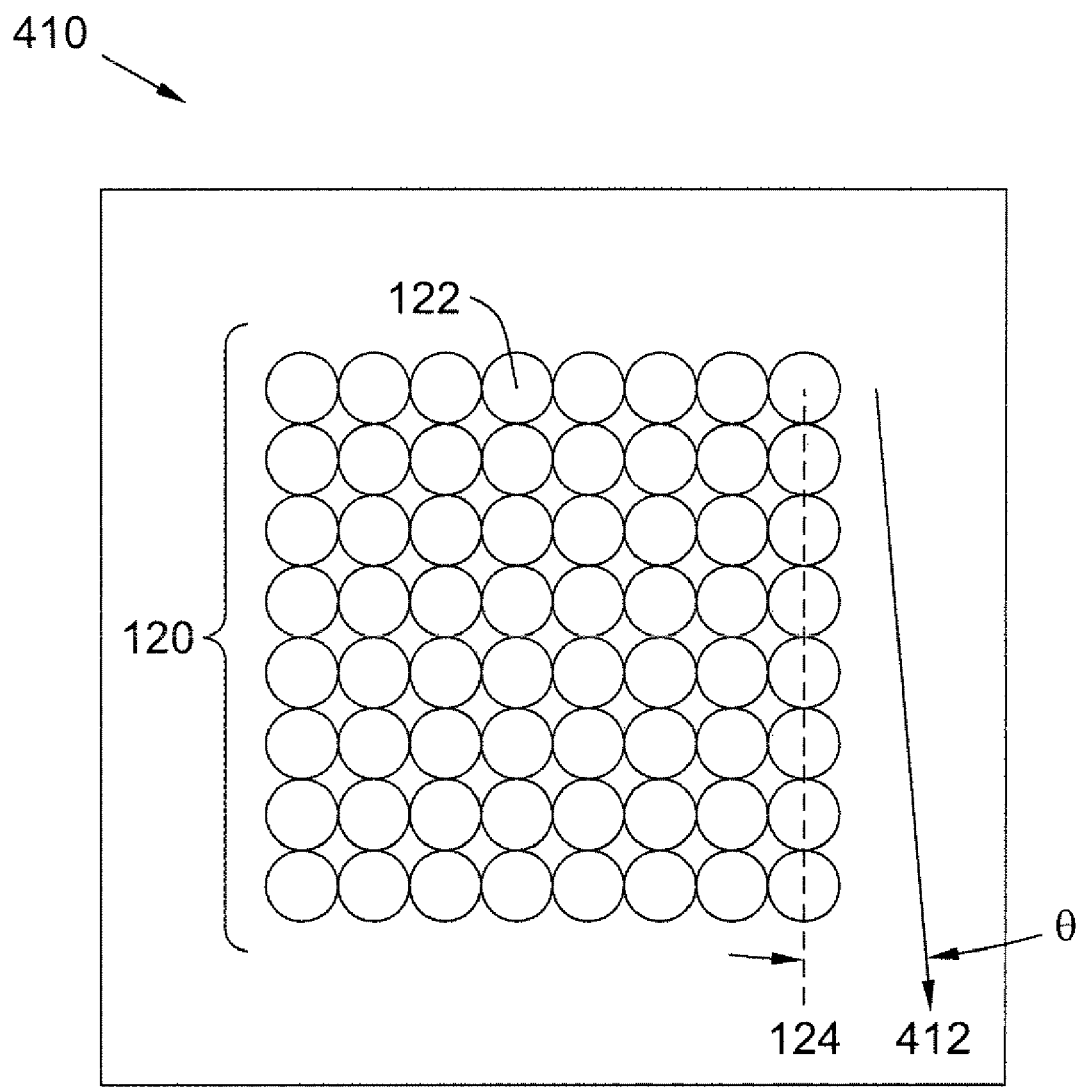
FIG. 7a is a front facing view of the filter array component of the embodiment of the present teachings illustrated in FIG. 6.

Reference is made to FIG. 7a, which is a front facing view of the linearly varying spectral filter component 410 of the embodiment of the present teachings 400 illustrated in FIG. 6. The direction of variation 412 of the spectral characteristics of the linearly varying filter 410 is oriented relative to the plane containing a column of optical axes 124 in the array of lenses 120 with angle θ.

Figure 7B:
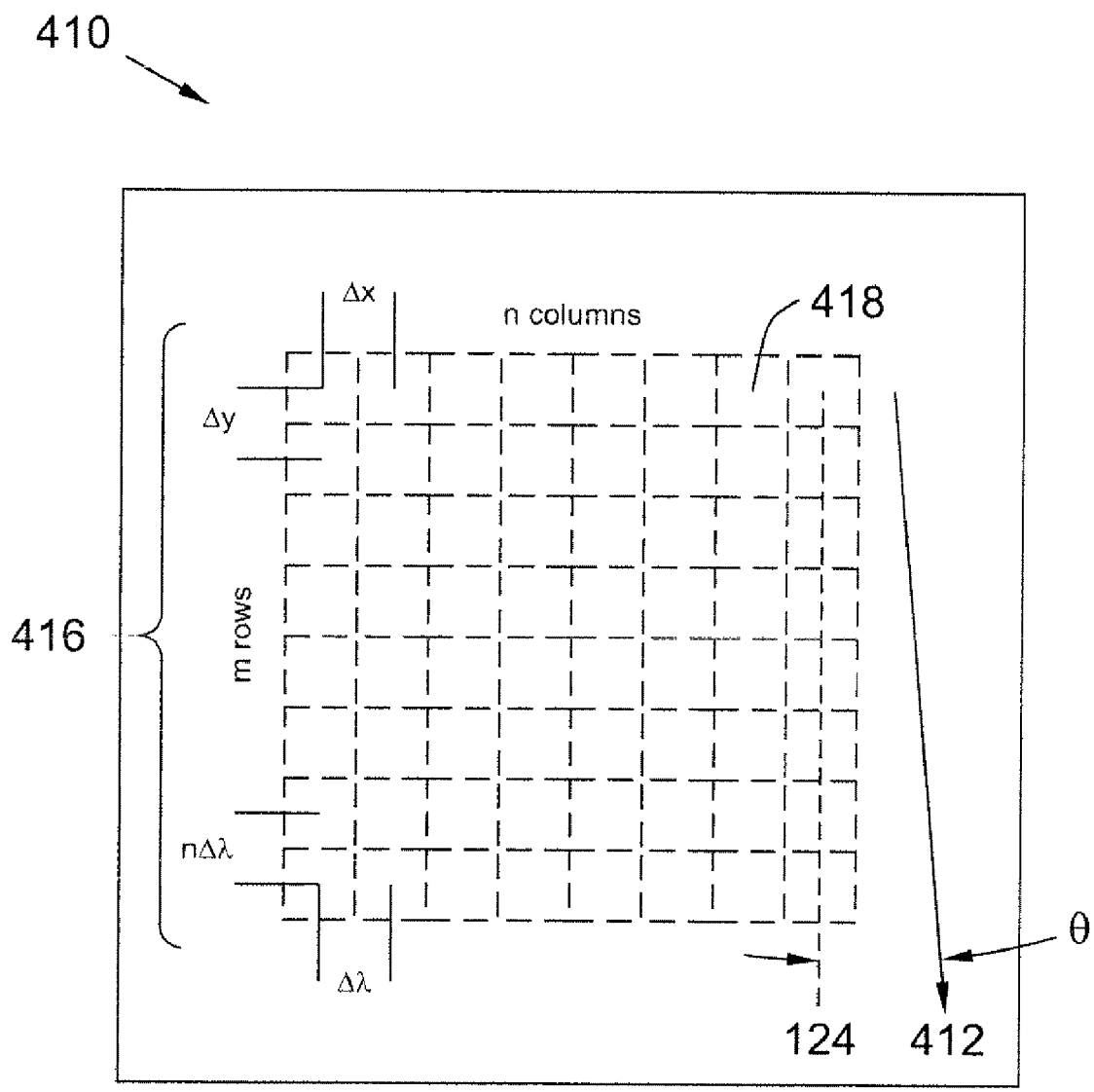
FIG. 7b is a further front facing view of the filter array component of the embodiment of the present teachings illustrated in FIG. 6.

Reference is made to FIG. 7b, which is another front facing view of the linearly varying spectral filter component 410 (in one instance, a wedge filter) of the embodiment of the present teachings 400 illustrated in FIG. 6. The orientation of the linearly varying filter 410 (in one instance, the orientation of the direction of linear variation) relative to the plane containing a column of optical axes 124 in the array of lenses 120 creates an array of filter regions 416 consisting of individual filter regions 418. In this embodiment, the angular orientation θ of the linearly varying spectral filter component 410 is determined according to the following equation:

$$\theta = \arctan[(\Delta y)/(n\Delta x)]$$

where Δx and Δy represent the horizontal and vertical spacing of the refractive microlens elements 122 of the array of lenses 120, and n represents the number of microlens elements 122 in a single row of the array of lenses 120. In this orientation, the individual filter regions 418 will have spectral characteristics that vary linearly from element to element by a shift in wavelength Δλ across the first row and continuing onto the next row, one row after the other, such that the first element in each row has a shift in wavelength equal to nΔλ. This implementation provides a very effective and inexpensive method to separate the image data into a series of images with linearly variable spectral characteristics.

Figure 8A:
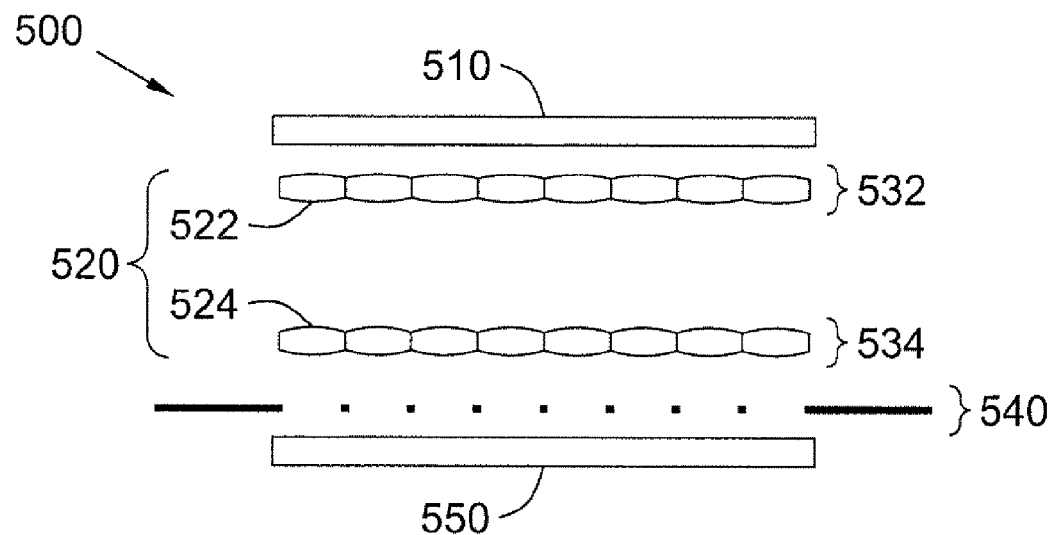
FIG. 8a is a schematic sectional view of a compact snapshot multispectral imaging system in accordance with a further embodiment of the present teachings, taken along a plane containing a column of optical axes.

Reference is made to FIG. 8a, which is a schematic sectional view of a further embodiment of these teachings 500, taken along a plane containing a column of optical axes. In operation, light is incident upon a spectral filter array 510 which substantially transmits various portions of the light to an array of lens systems 520, in this embodiment consisting of the lens arrays 532 and 534, each consisting of the refractive microlens elements 522 and 524 respectively. The light is then imaged by the array of lens systems 520 onto the image plane 550, passing through an array of apertures, or field stops, 540.

Figure 8B:
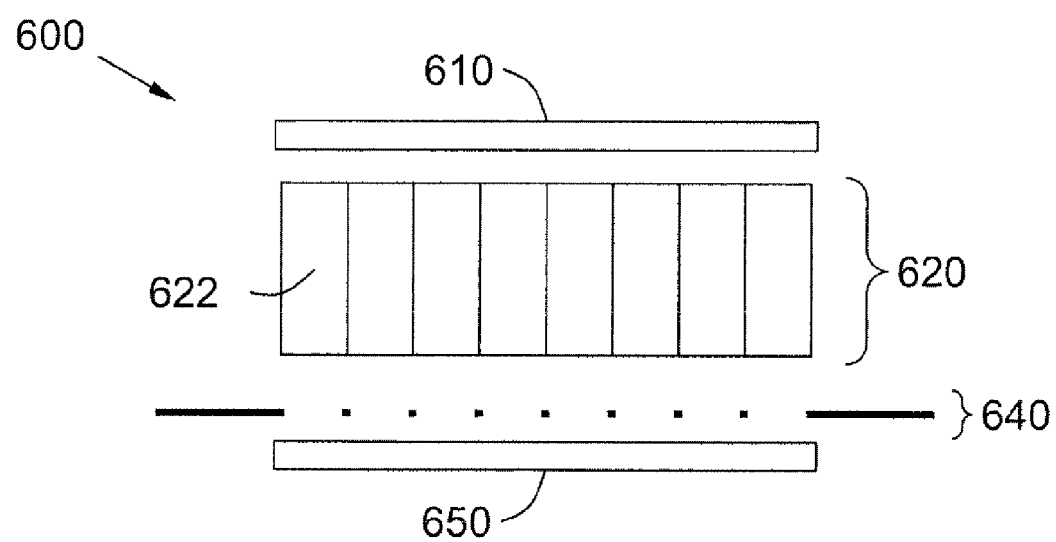
FIG. 8b is a schematic sectional view of a compact snapshot multispectral imaging system in accordance with a further embodiment of the present teachings, taken along a plane containing a column of optical axes.

Reference is made to FIG. 8b, which is a schematic sectional view of a further embodiment of these teachings 600, taken along a plane containing a column of optical axes. In operation, light is incident upon a spectral filter array 610 which substantially transmits various portions of the light to an array of gradient index rod lenses 620, in this embodiment consisting of the gradient index rod lens elements 622. The light is then imaged by the array of gradient index rod lenses 620 onto the image plane 650, passing through an array of apertures, or field stops, 640.

Figure 9:
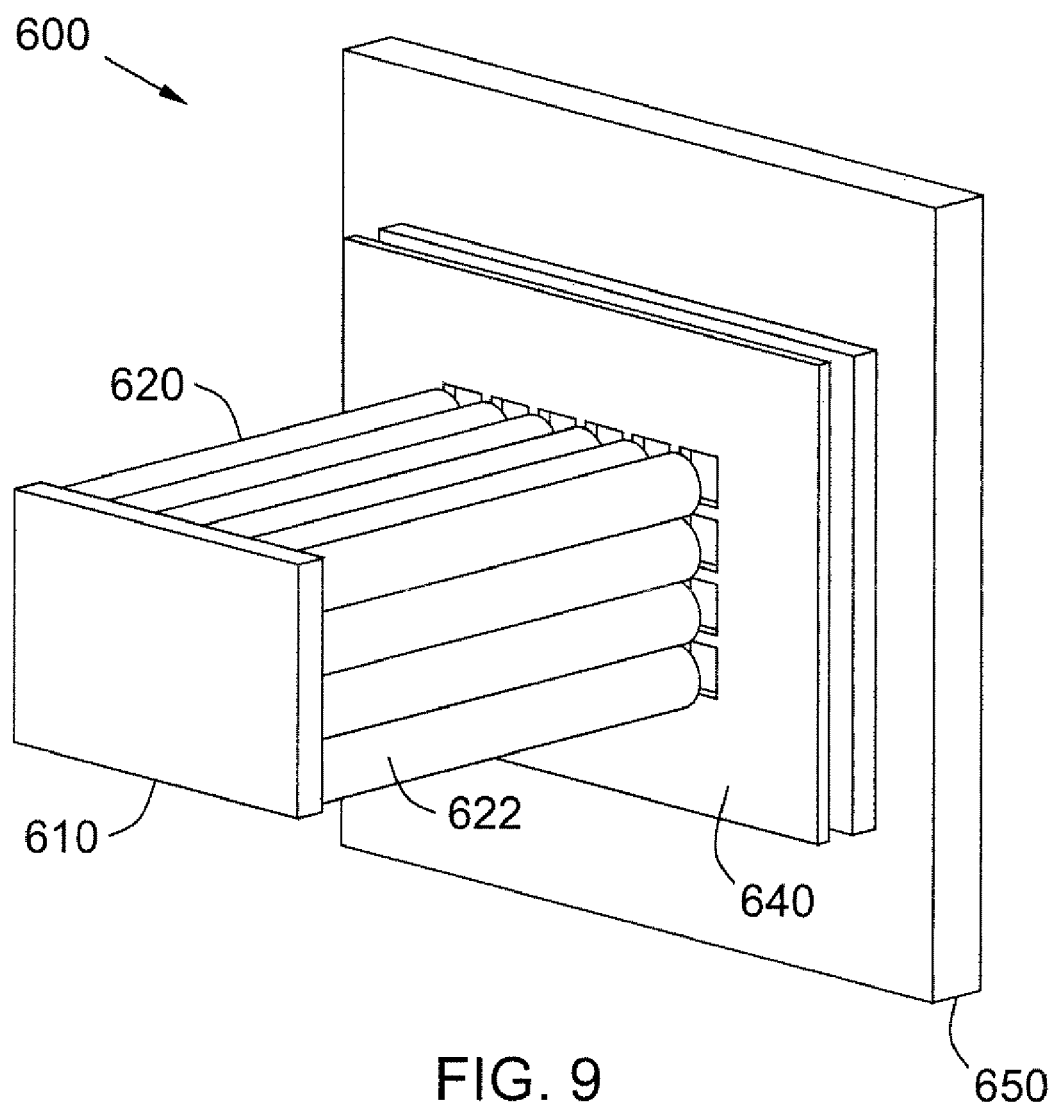
FIG. 9 is an isometric view of the embodiment of the present teachings illustrated in FIG. 8b.

Reference is made to FIG. 9, which is an isometric quarter cutaway view of the embodiment of the present teachings 600 illustrated in FIG. 7b.

Figure 10:
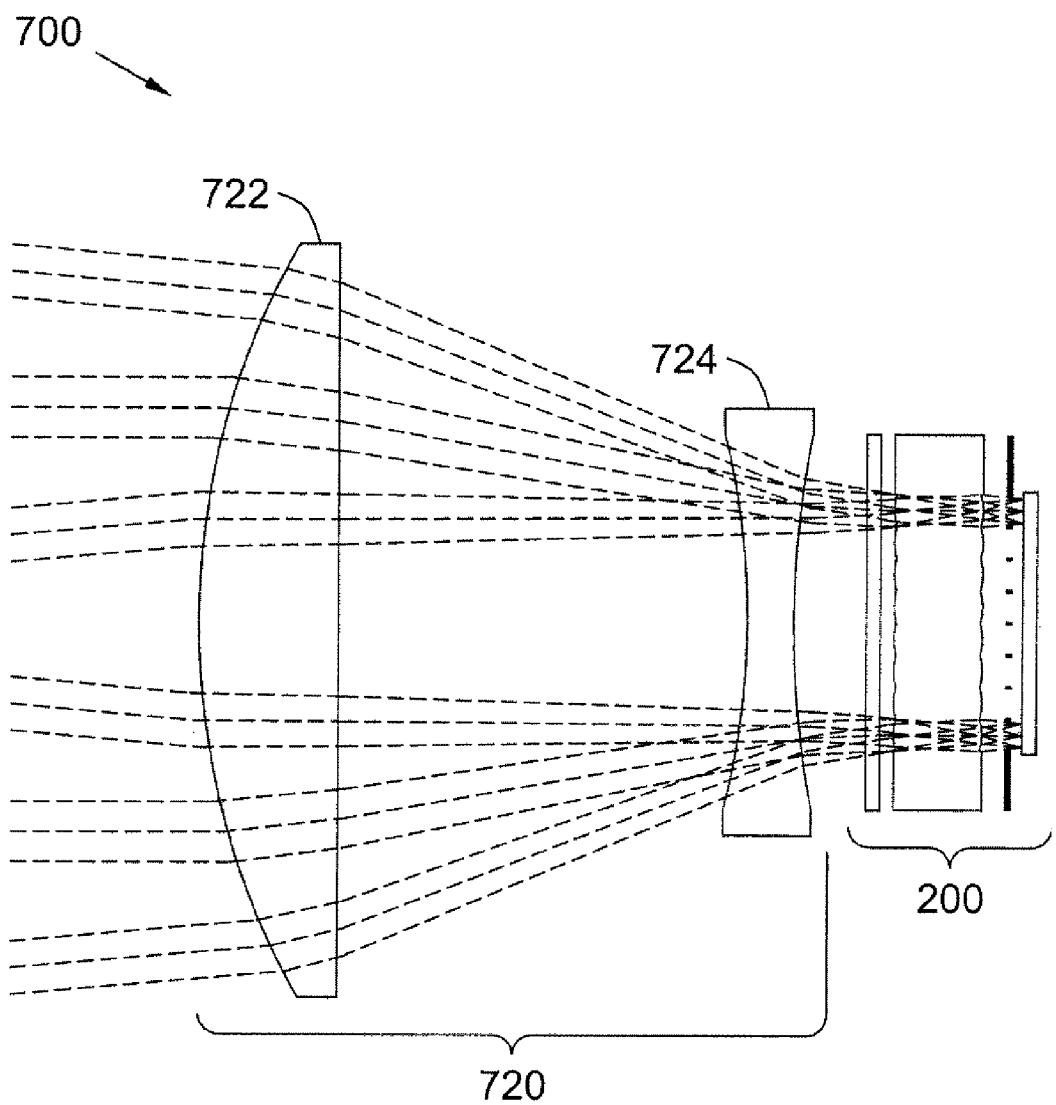
FIG. 10 is a schematic sectional view of a compact snapshot multispectral imaging system in accordance with a further embodiment of the present teachings, taken along a plane containing a column of optical axes.

Reference is made to FIG. 10, which is a schematic sectional view of a further embodiment 700 of these teachings, taken along a plane containing a column of optical axes. In operation, light is incident upon a substantially afocal lens system 720, in this embodiment consisting of refractive elements 722 and 724, which provides angular magnification to the incident light, which is substantially transmitted to the previous embodiment of the present teachings 200. In this manner, the angular resolution can be increased.

Figure 11:
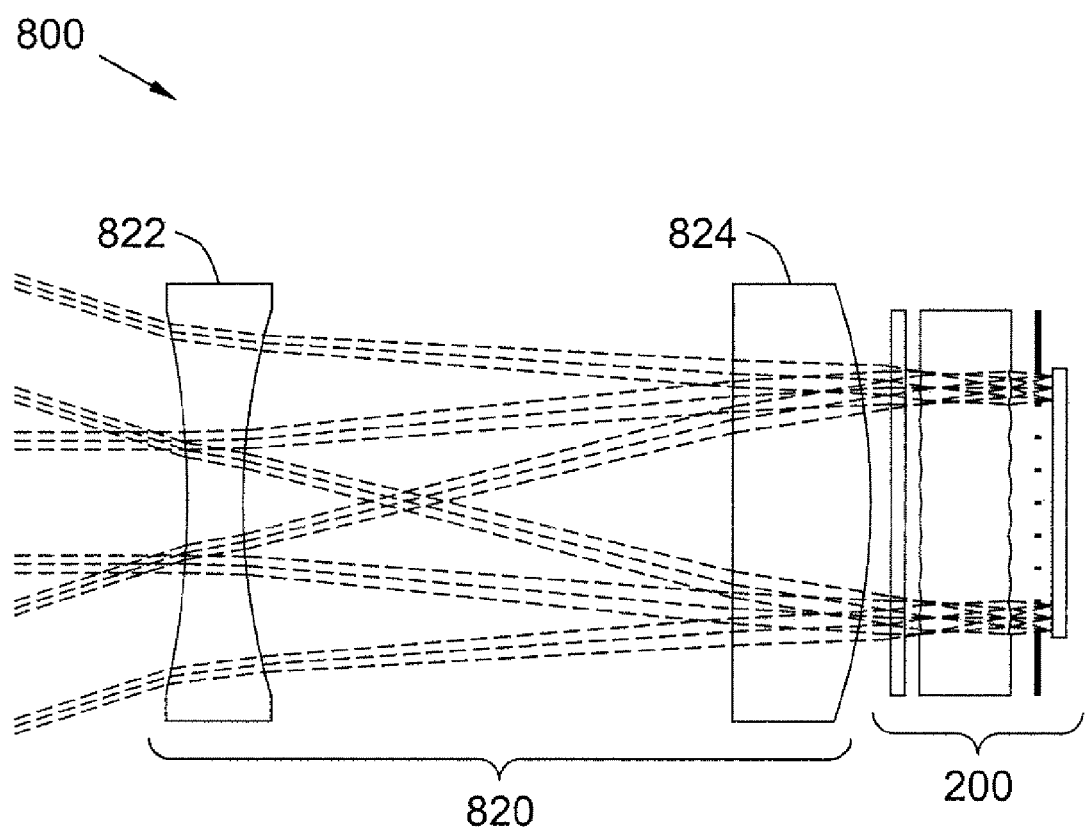
FIG. 11 is a schematic sectional view of a compact snapshot multispectral imaging system in accordance with a further embodiment of the present teachings, taken along a plane containing a column of optical axes.

Reference is made to FIG. 11, which is a schematic sectional view of a further embodiment 800 of these teachings, taken along a plane containing a column of optical axes. In operation, light is incident upon a substantially afocal lens system 820, in this embodiment consisting of refractive elements 822 and 824, which provides angular de-magnification to the incident light, which is substantially transmitted to the previous embodiment of the present teachings 200. In this manner, the field of view can be increased.

Figure 12:
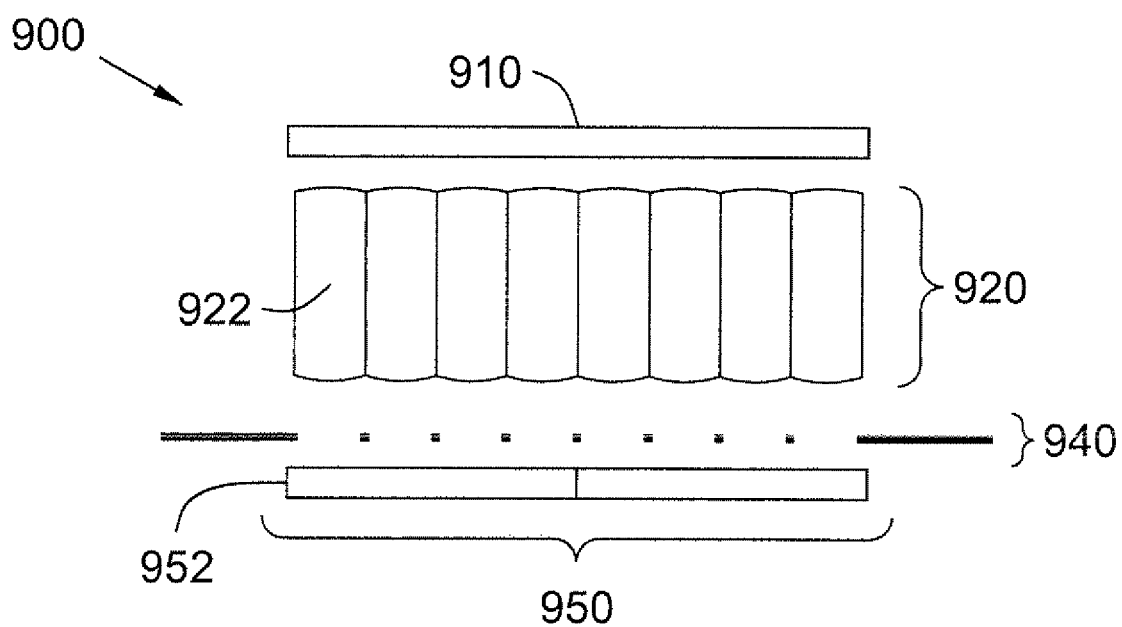
FIG. 12 is a schematic sectional view of a compact snapshot multispectral imaging system in accordance with a still further embodiment of the present teachings, taken along a plane containing a column of optical axes.

Reference is made to FIG. 12, which is a schematic sectional view of a still further embodiment of these teachings 900, taken along a plane containing a column of optical axes. In operation, light is incident upon a spectral filter array 910 which substantially transmits various portions of the light to an array of gradient index rod lenses 920, in this embodiment consisting of the gradient index rod lens elements 922. The light is then imaged by the array of lenses 920 onto the array of image planes 950, in this embodiment consisting of image plane elements 952, and passing through an array of apertures, or field stops, 940.

The form of the miniaturized imaging lens systems that make up the array of lenses or imagers can be any combination of refractive, diffractive, gradient index, or other optical element known in the art. These components need only be miniaturized and placed into arrays to form the miniaturized (micro-optic) lens arrays described above.

It should be noted that, although the arrays of miniaturized (micro-optical) imaging systems disclosed above comprise one or two planar array elements, the number of planar array elements is not a limitation of these teachings.

In one instance, during use of one embodiment of the system of these teachings, electromagnetic radiation incident and to one lens (or optical element) from the array of lenses 120, or, more generally, the array of optical elements), is spectrally filtered into substantially one spectral band having a predetermined central wavelength and, the filtered electromagnetic radiation is imaged by the lens onto one detector element from a detector array (or a portion of a detector system that substantially operates as a detector element from a detector array). In one instance, the spectral filtering is obtained by means of a filter capable of substantially operating as a filter array. The filtered electromagnetic radiation imaged by the lens is detected. In another instance, crosstalk between the electromagnetic radiation imaged onto one detector by one optical element and electromagnetic radiation image onto another detector by another optical element is substantially limited. In still another instance, the limitation of crosstalk is obtained by providing a spatial array of apertures or baffles.

Although the teachings have been described with respect to various embodiments, it should be realized that these teachings are also capable of a wide variety of further and other embodiments within the spirit and scope of the appended claims.

What is claimed is:
1. An imager comprising:
   a filter operating as a filter array; spectral characteristics of at least some filters for said filter array substantially varying across said filter array; said filter array receiving electromagnetic radiation originating from a predetermined object;

an array of optical elements; the array of optical elements being separate from the filter; each optical element from said array of optical elements optically disposed to receive electromagnetic radiation transmitted through at least one filter from said filter array;
a detector system substantially operating as a detector array of detector elements;
each detector element from said detector array comprising at least two pixels;
said each optical element from said array of optical elements being optically disposed to substantially image the electromagnetic radiation transmitted through said at least one filter onto at least one detector element from said detector array; said array of optical elements generating a substantially co-registered array of images.

2. The imager of claim 1 further comprising:
a spatial array of apertures; each aperture from said spatial array of apertures being optically disposed to receive the electromagnetic radiation imaged by one optical element from said array of optical elements and to transmit a portion of the received electromagnetic radiation to a detector element from said detector array.

3. The imager of claim 1 further comprising:
a spatial array of optical baffles, each optical baffle from said spatial array of optical baffles being optically disposed to receive the electromagnetic radiation imaged by one optical element from said array of optical elements and to transmit a portion of the received electromagnetic radiation to a detector element from said detector array.

4. The imager of claim 1 wherein each filter for said filter array is a substantially bandpass filter.

5. The imager of claim 1 wherein each filter for said filter array is a substantially low-pass filter.

6. The imager of claim 1 wherein each filter for said filter array is a substantially high-pass filter.

7. The imager of claim 1 wherein each filter for said filter array is an interference filter.

8. The imager of claim 1 wherein said filter is an linearly varying filter; said linearly varying filter having a filter transmission characteristics that varies along a physical axis; said physical axis being inclined with respect to an axis of said array of optical elements.

9. The imager of claim 8 wherein said physical axis is inclined with respect to set axis of said array of optical elements at an angle θ given by $$\theta = \arctan[(\Delta y)/(n\Delta x)];$$

wherein Δy represents a spacing along said axis between centers of consecutive elements from said array of optical elements;
Δx represents a spacing between centers of consecutive elements from said array of optical elements along another axis, said another axis being substantially perpendicular to said axis; and
n represents a number of optical elements from said array of optical elements, said optical elements being in a row along said another axis.

10. The imager of claim 1 wherein said filter is an array of filters.

11. The imager of claim 1 wherein each optical element from said array of optical elements provides substantially equal magnification.

12. The imager of claim 1 further comprising;
another optical component optically disposed to receive incoming electromagnetic radiation and to substantially transmit the received incoming electromagnetic radiation onto said filter with angular magnification.

13. The imager of claim 12 wherein said another optical component is an a focal lens system, said a focal lens system having a magnification greater than one.

14. The imager of claim 12 wherein said another optical component is an a focal lens system, said a focal lens system having a magnification smaller than one.

15. The imager of claim 1 wherein said detector system is a pixellated detector.

16. The imager of claim 15 wherein each detector element from said detector array comprises a number of pixels.

17. The imager of claim 1 wherein said detector system comprises an array of detector subsystems.

18. The imager of claim 17 wherein said detector subsystem is a pixellated detector.

19. The imager of claim 1 wherein said detector system comprises a plurality of detector subsystems wherein a spectral sensitivity of at least some of detector subsystems from said plurality of detector subsystems is different from a spectral sensitivity of at least some of other detector subsystems from said plurality of detector subsystems.

20. The imager of claim 1 wherein said detector system comprises a plurality of detector subsystems wherein at least some of detector subsystems from said plurality of detector subsystems are substantially the same as at least some of other detector subsystems from said plurality of detector subsystems.

21. The imager of claim 1 wherein said array of optical elements comprises an array of gradient index imaging (GRIN) rods.

22. The imager of claim 1 wherein said array of optical elements comprises an array of aspheric imaging lenses.

23. The imager of claim 1 wherein spectral characteristics of at least some filters of said filter array substantially vary across each row from said filter array and also substantially vary from one row to a subsequent row.

24. A method for providing a combined array of spatial and spectral images, the method comprising the steps of:
spectrally filtering into each one substantially spectral band from a plurality of substantially spectral bands, each substantially spectral band having a substantially different predetermined central wavelength, electromagnetic radiation; the electromagnetic radiation originating from a predetermined object; the filtered electromagnetic radiation in one substantially spectral band being incident onto one optical element from an array of optical elements; said an array of optical elements being separate from a filter performing the spectral filtering;
imaging, utilizing the array of optical elements, the incident filtered electromagnetic radiation a detector array;
detecting, with one detector from a detector array, electromagnetic radiation imaged by said one optical element; and
generating, at the detector array, a substantially co-registered array of images.

25. The method of claim 24 further comprising the step of substantially limiting crosstalk between the electromagnetic radiation imaged onto said one detector by said one optical element and electromagnetic radiation imaged by a neighboring optical element.

26. The method of claim 25 wherein the step of substantially limiting crosstalk comprises the step of providing a spatial array of apertures; each aperture from said spatial array being optically disposed to receive the electromagnetic radiation imaged by one optical element from said array of optical elements and to transmit a portion of the received electromagnetic radiation to a detector element from said detector array.

27. The method of claim 24 wherein the step of spectrally filtering comprises the step of providing a filter substantially operating as a filter array of spectral filters.

28. An imager comprising:

a filter substantially operating as a filter array; spectral characteristics of at least some filters from said filter array substantially varying across said filter array; an array of optical elements; the array of optical elements being separate from the filter; each optical element from said array of optical elements optically disposed to receive electromagnetic radiation transmitted through one filter from said filter array; the electromagnetic radiation originating from a predetermined object; and a detector array of detector elements; each detector element from said detector array comprising at least two pixels;

said each optical element from said array of optical elements being optically disposed to substantially image the electromagnetic radiation transmitted through said one filter onto at least one detector element from said detector array; said array of optical elements generating, at the detector array, a substantially co-registered array of images.

29. The imager of claim 28 further comprising:

a spatial array of apertures; each aperture from said spatial array of apertures being optically disposed to receive the electromagnetic radiation imaged by one optical element from said array of optical elements and to transmit a portion of the received electromagnetic radiation to a detector element from said detector array.

30. The imager of claim 28 further comprising:

a spatial array of optical baffles, each optical baffle from said spatial array of optical baffles being optically disposed to receive the electromagnetic radiation imaged by one optical element from said array of optical elements and to transmit a portion of the received electromagnetic radiation to a detector element from said detector array.

31. The imager of claim 28 wherein each filter for said filter array is a substantially bandpass filter.

32. The imager of claim 28 wherein each filter for said filter array is a substantially low-pass filter.

33. The imager of claim 28 wherein each filter for said filter array is a substantially high-pass filter.

34. The imager of claim 28 wherein each filter for said filter array is an interference filter.

35. The imager of claim 28 wherein said filter is an linearly varying filter; said linearly varying filter having a filter transmission characteristics that varies along a physical axis;

said physical axis being inclined with respect to an axis of said array of optical elements.

36. The imager of claim 35 wherein said physical axis is inclined with respect to set axis of said array of optical elements at an angle $\theta$ given by $$\theta = \arctan[(\Delta y)/(n\Delta x)];$$

wherein $\Delta y$ represents a spacing along said axis between centers of consecutive elements from said array of optical elements;

$\Delta x$ represents a spacing between centers of consecutive elements from said array of optical elements along another axis, said another axis being substantially perpendicular to said axis; and n represents a number of optical elements from said array of optical elements, said optical elements being in a row along said another axis.

37. The imager of claim 28 wherein said filter is an array of filters.

38. The imager of claim 28 wherein each optical element from said array of optical elements provides substantially equal magnification.

39. The imager of claim 28 further comprising;

another optical component optically disposed to receive incoming electromagnetic radiation and to substantially transmit the received incoming electromagnetic radiation onto said filter with angular magnification.

40. The imager of claim 39 wherein said another optical component is an a focal lens system, said a focal lens system having a magnification greater than one.

41. The imager of claim 39 wherein said another optical component is an a focal lens system, said a focal lens system having a magnification smaller than one.

42. The imager of claim 28 wherein said detector array is a pixellated detector array.

43. The imager of claim 42 wherein each detector element from said detector array comprises a number of pixels.

44. The imager of claim 28 wherein spectral characteristics of at least some filters of said filter array substantially vary across each row from said filter array and also substantially vary from one row to a subsequent row.

* * * * *